Nov. 20, 1962  G. M. TOKOS ETAL  3,064,403
APPARATUS AND METHOD FOR HEAT SEALING WRAPPERS ABOUT ARTICLES
Filed Jan. 20, 1959  4 Sheets-Sheet 1

INVENTOR
George M. Tokos
Harry R. Jasper
BY
Fryer + Johnson
Attorneys

Nov. 20, 1962   G. M. TOKOS ETAL   3,064,403
APPARATUS AND METHOD FOR HEAT SEALING WRAPPERS ABOUT ARTICLES
Filed Jan. 20, 1959   4 Sheets-Sheet 2

INVENTOR
George M. Tokos
Harry R. Jasper
BY
Attorneys

Nov. 20, 1962   G. M. TOKOS ETAL   3,064,403
APPARATUS AND METHOD FOR HEAT SEALING WRAPPERS ABOUT ARTICLES
Filed Jan. 20, 1959   4 Sheets-Sheet 3
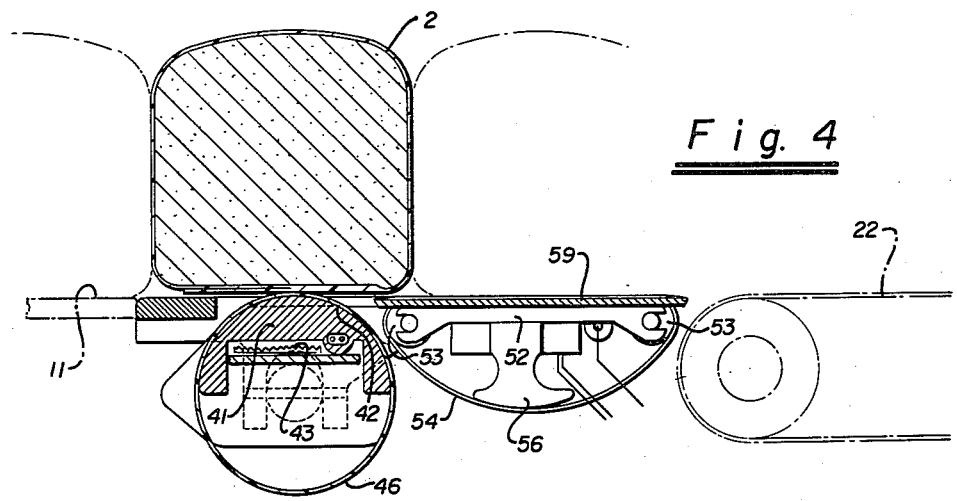
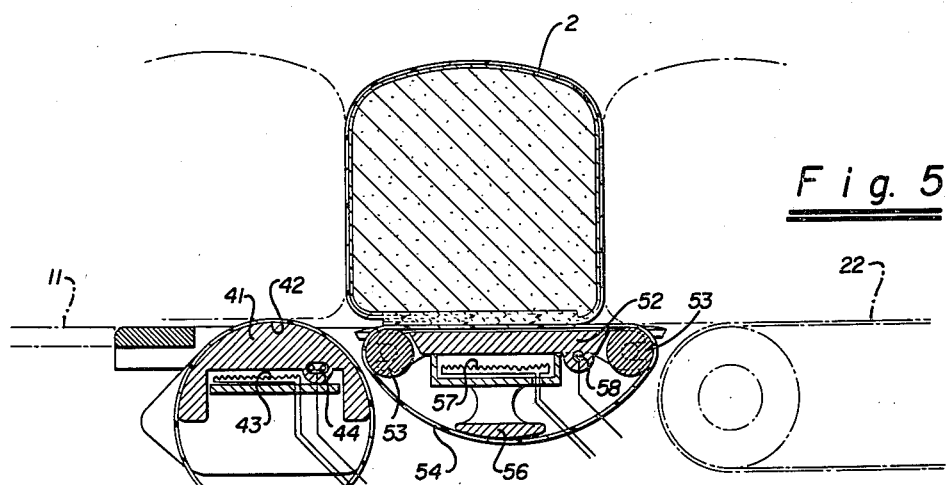
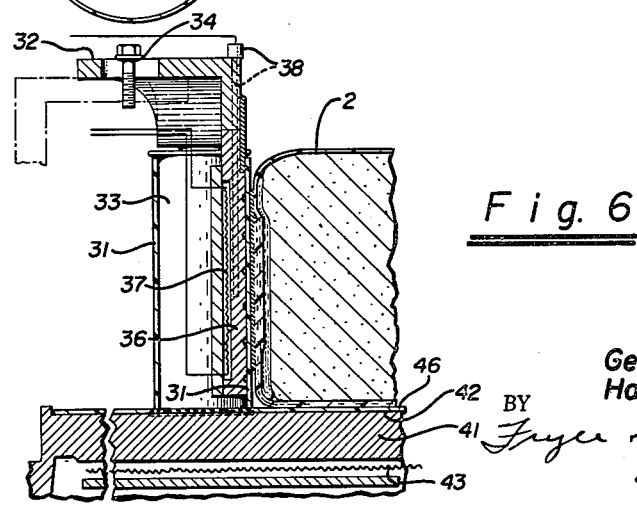
INVENTOR
George M. Tokos
Harry R. Jasper
BY
Fryer - Johnson
Attorneys

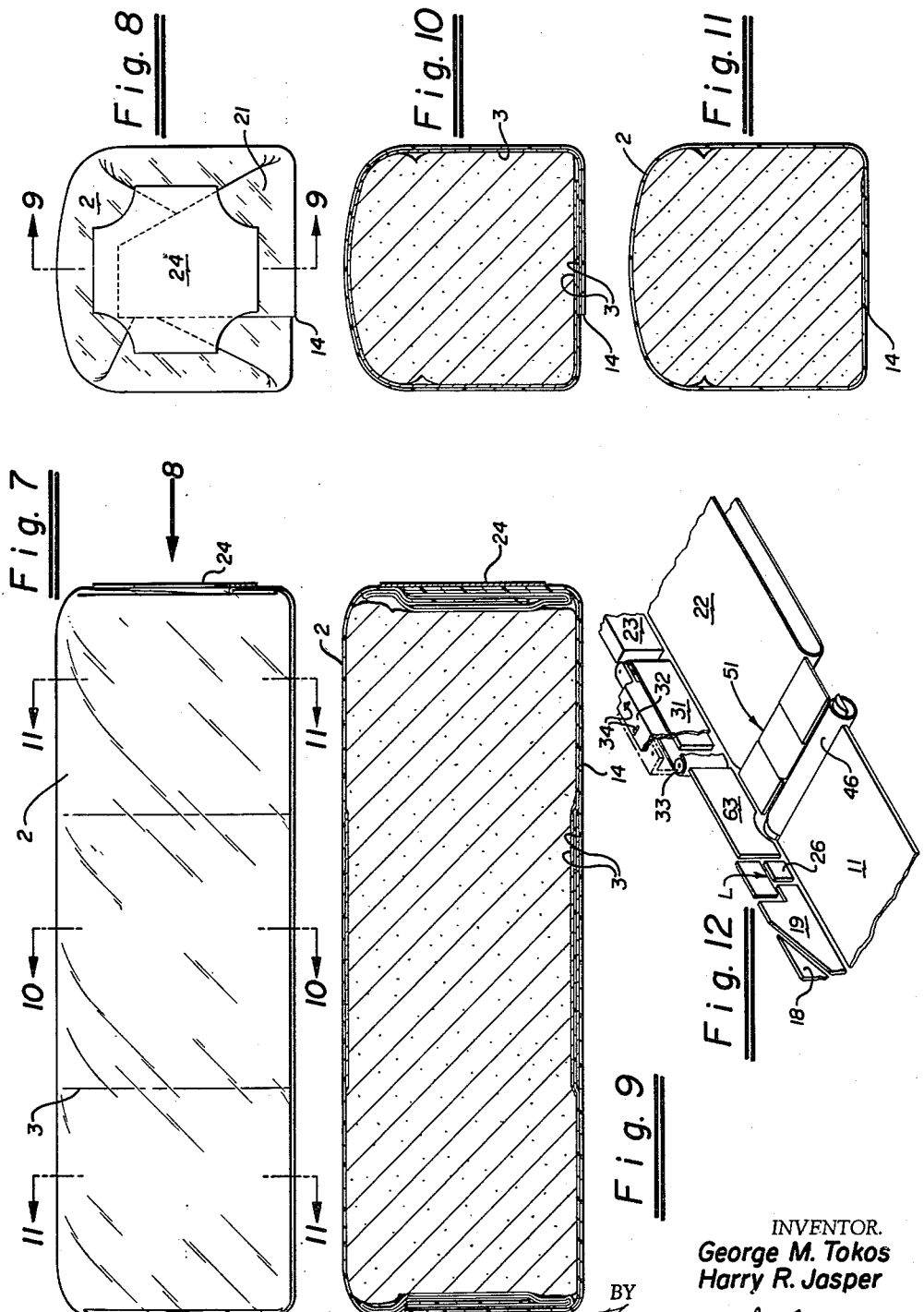

United States Patent Office 3,064,403
Patented Nov. 20, 1962

1

3,064,403
APPARATUS AND METHOD FOR HEAT SEALING
WRAPPERS ABOUT ARTICLES
George M. Tokos, Hayward, and Harry R. Jasper, El
Cerrito, Calif., assignors to Crown Zellerbach Corporation, San Francisco, Calif., a corporation of Nevada
Filed Jan. 20, 1959, Ser. No. 787,902
15 Claims. (Cl. 53—39)

This invention relates to an apparatus and method for heat sealing overlapped portions of a wrapper of polyethylene film as well as other heat sealable material about an article such as bread or the like, and more particularly to heat sealing wrapper end folds at the ends of the article and a longitudinally extending seam along a side of the article.

The apparatus and method are particularly adapted for bread wrappers for use in combination with a well known type of bread wrapping machine but it is to be understood that they may be employed for sealing the overlapped portions of a wrapper about any other article. Therefore, in the following description where bread alone may be referred to as the article, it is to be understood that such reference is intended to include application of the principles of this invention to other types of articles.

It is prevalent to wrap bread in automatic machinery with heat sealable wrappers such as waxed coated paper or lacquer coated cellophane, and to heat seal the overlapped end folds of the wrapper as well as the longitudinal seam by means of heat sealing equipment. The heat sealing equipment in such type of well known machine has heretofore consisted essentially of heated fixed metal parts against which the overlapped portions of a wrapper to be heat sealed engage and move therepast. Heat sealing equipment of this character is perfectly satisfactory for heretofore employed wrappers of the character described because when heated to a heat sealable temperature enabling portions of a wrapper to fuse together, the heat sealable material of the wrapper has self-lubricating properties and consequently does not stick to the heated metal parts.

Polyethylene film which is thin and can be very readily damaged particularly at about its fusion temperature can not be satisfactorily employed with such type of heat sealing equipment because the polyethylene has relatively high frictional drag in the region of its heat sealing or fusion temperature. It becomes quite soft and sticky, thus leaving residues which foul up the heat sealing equipment, and the polyethylene is very apt to become damaged because of frictional drag thus rendering it unsatisfactory as a wrapper.

Objects of the invention, among others, are the provision of a simple and comparatively inexpensive heat sealing method, and apparatus that can be installed readily as an attachment in existing wrapping and heat sealing machinery of the character described for overcoming the above problem, thus rendering such machinery capable of operation on polyethylene film, which also can be employed with wrapping machinery of any other type; and which can still be used with other heat sealable material of the character heretofore employed as a wrapper about bread, as well as with the polyethylene film for which the invention is particularly adapted. Other objects of the invention will become apparent from a perusal of the following description.

Summarizing the invention, it comprises the provision of a plurality of heat sealing elements corresponding in number to the regions of overlapped portions of the wrapper about the article, such as end folds and a seam to be heat sealed. Each of the elements has an exposed surface engageable with the wrapper and which is of

2 a material readily releasable from heated tacky polyethylene. Means is provided for mounting each of such heat sealing elements for free unrestrained movement. As a result, when the wrapper regions to be heat sealed are engaged with the heated heat sealing elements and the bread is moved, the moving bread drives the heat sealing elements so that there can be no relative frictional movement between the bread and such elements. Consequently, even though polyethylene film may be inherently sticky or tacky in the region of its fusion temperature, it will not become damaged, and the readily releasable surfaces of the heat sealing elements enable the polyethylene film wrapper to be disengaged from the same without sticking thereto.

Reference is now made to the drawings for a more detailed description of the invention, in which:

FIG. 4 is a vertical sectional view taken in a plane indicated by line 4—4 in FIG. 3, and illustrating wrapped bread thereon;

FIG. 5 is a similar view taken in a plane indicated by line 5—5 in FIG. 3 with the wrapped bread in a different position;

FIG. 6 is a sectional view taken in a plane indicated by the line 6—6 in FIG. 3;

FIG. 7 is a side elevational view of wrapped bread heat sealed by the apparatus;

FIG. 8 is an end view looking in the direction of arrow 8 in FIG. 7;

FIG. 9 is a vertical longitudinal section taken in a plane indicated by the line 9—9 in FIG. 8;

FIG. 10 is a vertical transverse section taken in a plane indicated by line 10—10 in FIG. 7;

FIG. 11 is a similar section taken in either of the planes indicated by the two section lines 11—11 in FIG. 7;

FIG. 12 is a view similar to FIG. 2 of a modified arrangement of the heat sealing elements of the apparatus.

Figure 1:
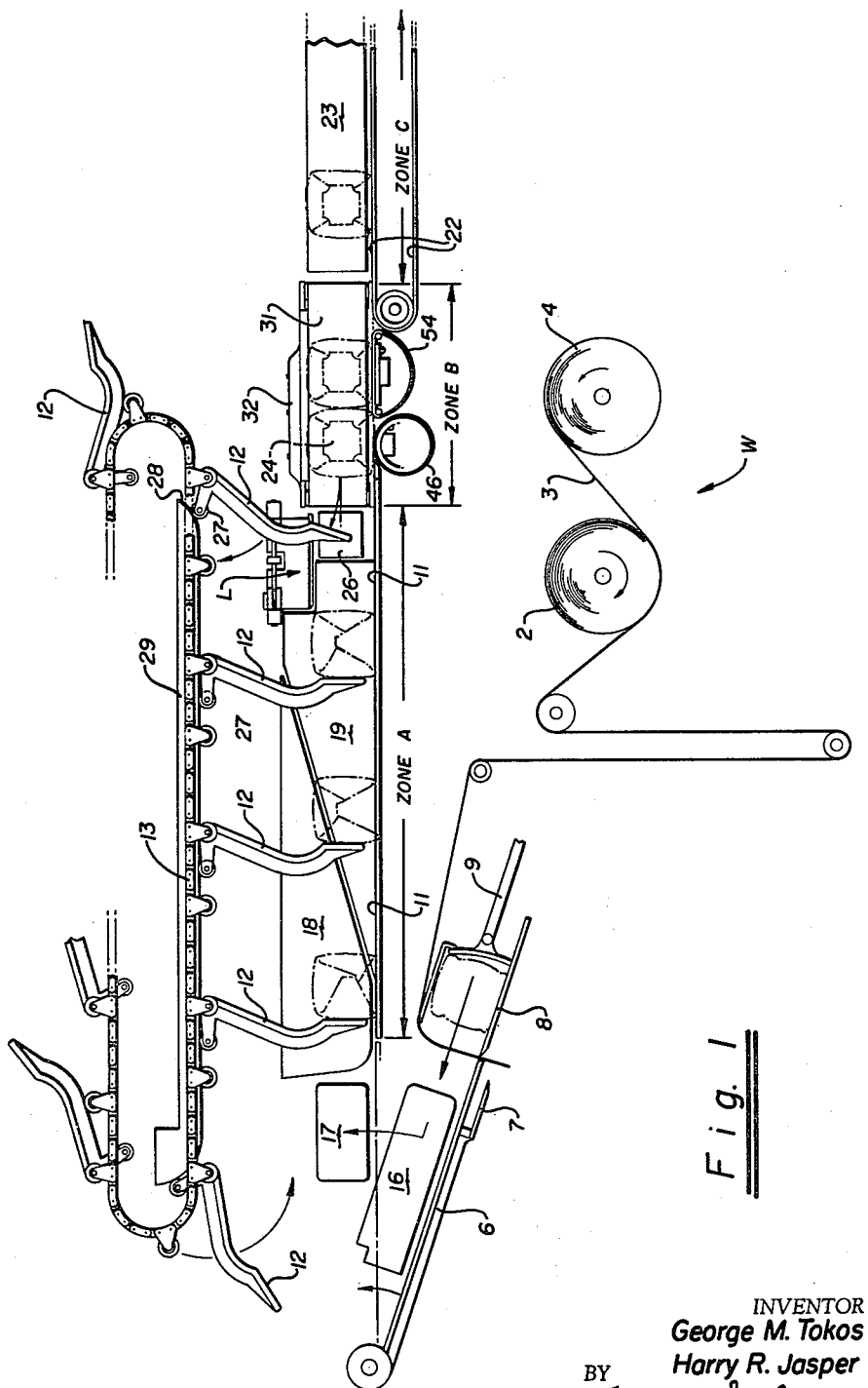
FIG. 1 is a fragmentary more or less schematic side elevational view of a well known type of bread wrapping machine, showing some of the parts of such machine in association with the heat sealing apparatus of this invention which is incorporated therein in place of the heat sealing apparatus heretofore employed in the machine.

With reference to FIG. 1 for orientation, this view as previously explained illustrates some of the principal parts of a well known type of bread wrapping machine known as the "A.M.F.-Super Standard Wrapping Machine," manufactured by American Machine and Foundry Company of Brooklyn, New York. The various parts of such machine are disclosed in various United States patents, and hence reference will be made to such patents to shorten the description of the general construction of the machine. The heat sealing apparatus hereof is shown as it is located and installed as an attachment in the machine.

The machine comprises wrapper roll unwinding section W from which a wrapper sheet 2 is continuously unwound from a supply roll. Usually the wrapper is unprinted, and it is customary to wrap the same with a printed band 3 having heat sealable material and which is unwound from supply roll 4. This band is usually of wax coated paper, and is now usually wound inside the wrapper, being narrower than the wrapper as can be seen best from FIG. 7. U.S. Patent No. 1,926,245, dated Sept. 12, 1933, illustrates an arrangement of this character but with the band outside the wrapper. If the band is to be inside, its position is reversed.

The wrapper together with the band form a continuous web; and the initial step of the wrapping is to push a loaf of bread into the web so that it becomes infolded in the leading end of the web. Movement of the loaf serves to pull off the supply rolls sufficient length of material to wrap the loaf. Typical arrangements of such character are illustrated in U.S. Patents Nos. 1,626,379, dated April 26, 1927, and 1,805,677, dated May 19, 1931. The parts of such apparatus illustrated in FIG. 1 of the drawings comprise a pivotally mounted transfer table 6 having a wrapper severing knife 7, a support 8 onto which the respective loaves of bread are fed endwise by mechanism (not shown), and reciprocating pusher member 9. When a loaf becomes infolded in the wrapper web and is moved onto transfer table 6, the transfer table moves upwardly by the driving mechanism (not shown) to the plane of horizontal trackway 11 of the machine. It is pushed from transfer table 6 onto trackway 11 by spring urged pusher arms 12 pivotally carried by continuously driven spaced apart endless conveyor chains 13.

The pusher arm arrangement is disclosed in typical U.S. Patents Nos. 1,885,592, dated Nov. 1, 1932, and 2,006,711, dated July 2, 1935. Such pusher arms initially continuously move the bread loaves in equally spaced apart relationship along trackway 11. The extent of continuous movement is indicated by the zone marked A in FIG. 1. During the transfer from transfer table 6 to trackway 11 and while the bread loves are moved along the trackway, a longitudinally extending seam 14 is provided by overlapped portions along the bottom side of each loaf as is best seen in FIGS. 8 and 11, and four end overlapped portions or folds are formed over each end of the loaf. These folds are effected by the fold members 16, 17, 18 and 19 shown in FIG. 1. FIG. 8 illustrates the folds at an end of the loaf, the outermost end fold 21 being formed by passage of the loaf past the so-called fourth folder 19.

Heat sealing of the overlapped portions of the wrapper is effected in zone B shown in FIG. 1, in which successive loaves are brought in contact with each other and are moved intermittently, as will be described more fully hereinafter; and zone C is the so-called polar zone through which the loaves with their heat sealed wrapper are continuously moved by endless conveyor 22 between spaced apart refrigerated hollow tanks 23 against which the end folds engage whereby they can become chilled to harden or set quickly the heat sealable material. Such polar zone is illustrated in typical U.S. Patents Nos. 2,151,653, dated March 21, 1939, and 2,175,274, dated October 10, 1939.

In many instances, just before the wrapped loaves reach the heat sealing zone B, end labels 24 (FIG. 8) are applied over the ends of the respective wrappers to seal over the end folds. For this purpose, the apparatus includes end label cutting and applying mechanism L which includes reciprocating plunger 26 which applies the end labels as they are cut by the mechanism, to the ends of the bread loaf. Mechanism of this character is illustrated in typical U.S. Patents Nos. 2,349,317, dated May 23, 1944, and 2,409,065, dated October 8, 1946; the label roll (not shown) from which the labels are consecutively cut being an attachment which may be of the type shown in U.S. Patent No. 2,266,087, dated Dec. 16, 1941.

As previously related, the loaves are moved intermittently through heat sealing zone B. This intermittent movement is effected by the pusher arm arrangement shown in the aforementioned Patents Nos. 1,855,952 and 2,066,711 whereby as the respective arms 12 arrive at the beginning of zone B, they are caused to swing away from the respective loaves in a clockwise direction with reference to FIG. 1. Such swinging movement is caused by the spring urging of the respective arms in a clockwise direction and occurs when a roller 27 on each arm leaves the arcuate end 28 of a cam track upon which the roller rides. As a result each loaf continuously moved through zone A by an arm remains momentarily stationary upon entering the heat sealing zone B, and is only moved the width of one loaf by the next succeeding loaf as it comes in engagement therewith. Such intermittent movement contnues in zone B until the respective loaves are picked off the zone by the continuously moving conveyor 22 in polar zone C. Thus, in zone B, the loaves are moved intermittently in engagement with each other, so that they have momentary dwell periods of rest.

Normally, in the type of apparatus under discussion, the heat sealing in zone B is effected by heated metal plates and other metal members which are fixedly mounted. It is also common to heat the metal folders 18 and 19 for the ends of the wrapper. Such heating is effected by conventional electrical heating means. Wrappers, such as wax coated paper and lacquer coated cellophane, have sufficient slip and strength when heated to their heat sealing temperatures to move past these fixed heat sealing surfaces without damage. However, this is not so with heated polyethylene film because of the tacky character thereof when heated in the region of its heat sealing or fusion temperature.

Figure 2:
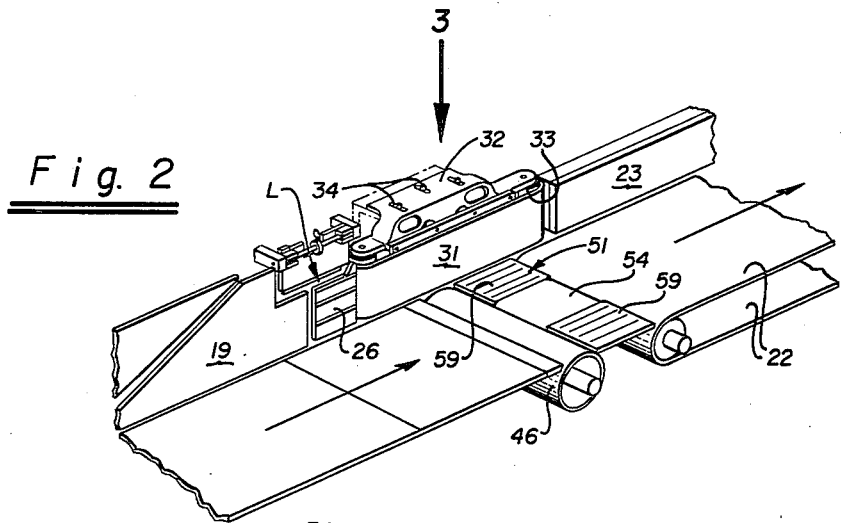
FIG. 2 is a fragmentary isometric view of that portion of the apparatus containing the heat sealing apparatus hereof, with one side of the apparatus removed to illustrate more clearly the arrangement.
Figure 3:
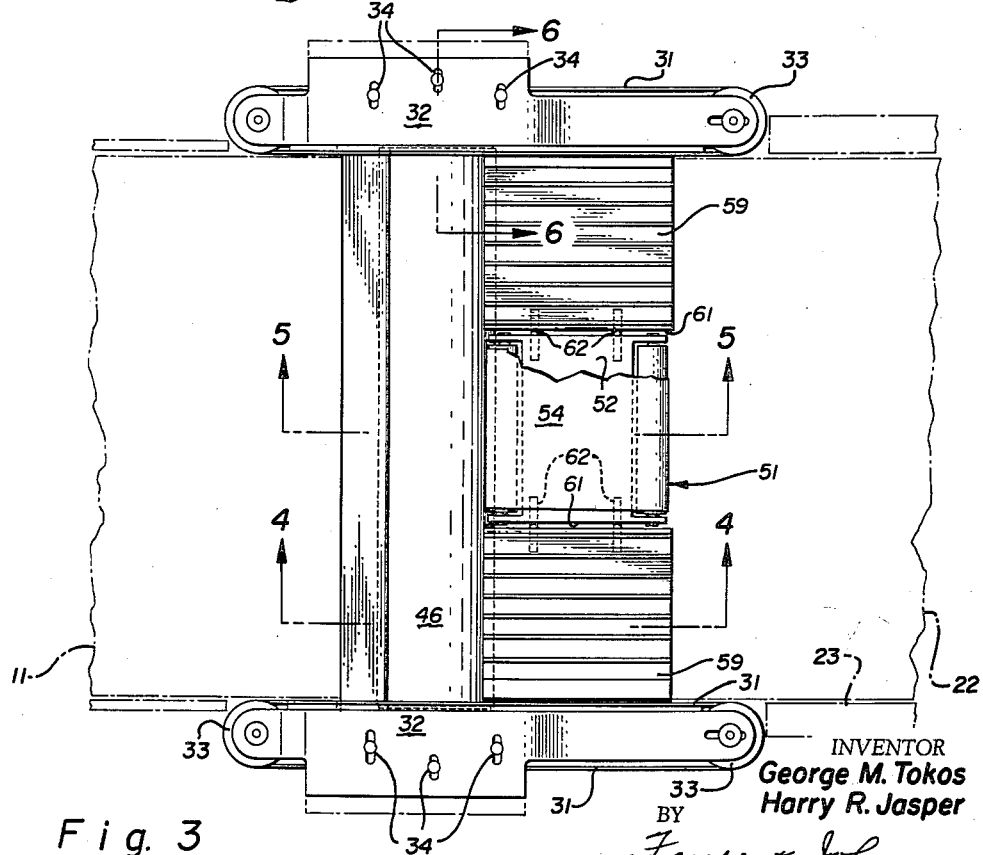
FIG. 3 is a plan view of the apparatus hereof looking in the direction of arrow 3 in FIG. 2.

The attachment apparatus hereof which permits use of polyethylene film in the machine, as well as other wrappers, is substituted for the heretofore employed heat sealing means in zone B. With particular reference to FIGS. 1, 2 and 3, such apparatus comprises a pair of endless sheets in the form of endless flexible belts 31. Each belt is mounted on a metal framework 32 which carries a pair of spaced apart freely journalled upright rollers 33. Each framework 32 is mounted for adjustment on the side frame of the machine by suitable means, such as conventional slot and bolt and nut adjusting means indicated at 34. Also carried by each framework 32 is a flat metal plate 36 heated by electrical resistance elements 37 and which is surrounded by the associated belt with the inside reach of the belt engageable with the plate so that the plate can impart heat to the belt; the plate 36 being located between the associated rollers 33. Suitable automatic heat sensing means 38 is provided to control the temperature of the heating plates 36 by maintaining their temperature substantially constant in the region of the fusion temperature of the wrapper film.

The inner reaches of belts 31 are spaced apart a distance substantially equal to the length of the bread loaves whereby as the wrapped bread loaves are moved therepast, their ends engage the belts and drive the same. In this connection, the adjusting means 34 for the frameworks 32 allow for proper alinement of the belts; and the belts are adjusted on the machine to apply the usual pressure against the ends of the loaves. As the ends of the loaves engage the belts, the wrapper end folds become heat sealed together. It will be noted that the leading ends of the belts 31 are adjacent the end label applying plungers 26; and if labels are to be applied, they become heat sealed to the wrapper end folds together with sealing of the ends folds themselves.

Any suitable material can be employed for belts 31 provided it has an exposed surface, in other words a surface engageable by the wrapper end folds, which is readily releasable from heated tacky polyethylene. The material found most advantageous thus far is flexible fiber glass cloth coated with "Teflon" plastic which is a product of Du Pont. "Teflon" is a fluorine-substituted polyethylene specifically polytetrafluoro-ethylene. Another suitable fluorine-substituted polyethylene as the belt coating is trifluoro-monochloroethylene, known as "Kel-F" which is a product of M. W. Kellogg Co. Silicone-varnished glass cloth may also be employed. If desired, the cloth need not be of glass fibre provided it is highly resistant to temperature degradation. Glass cloth is preferred because of its resistance to heat and its strength. Flexible highly polished stainless steel or chrome plated steel belts may also be utilized but are not as satisfactory.

Means is also provided as part of the heat sealing apparatus for heating the bottom seam 14 of the respective loaves. Such means desirably comprises a metal heat imparting anvil 41 having an arcuate top surface 42 in the form of an arc of a circle. It is fixedly mounted between the side frame members of the machine, and has electrical resistance element 43 for heating the same. Suitable heat sensing control means 44 is provided in anvil 41 for automatically controlling its temperature.

Anvil 41 supports an endless sheet 46 in the form of a sleeve of generally cylindrical contour and which is desirably of the same material as belts 31 whereby its exposed surface is also readily releasable from heated tacky polyethylene. Also, anvil 41 and sleeve 46 extend transversely substantially the distance between the inner reaches of belts 31 so that they are substantially the same length as the loaves of bread, whereby substantially the entire length of the seams 14 on the bottom sides of the bread loaves can engage sleeves 46. In this connection, anvil 41 and sleeve 46 are located at a fixed location in zone B at which the respective loaves of bread have their first dwell period of rest. This insures sufficient time for imparting heat to the wrapper seams.

Sleeve 46 is freely movable on anvil 41. Hence, as a wrapped bread loaf is moved therepast, it will also be driven by the loaf to thus obviate relative frictional movement between the bread and the sleeve. In effect, anvil 41 and sleeve 46 provide freely rotatable roller means over which the wrapper seams 14 ride. A rotatable roller having an exposed surface of the desirable material readily releasable from heated tacky polyethylene can be employed in place of the preferred construction, but the fixed anvil-sleeve arrangement is advantageous because it is mechanically easier to heat a fixed anvil than a rotatable metal roller.

At a second fixed location in zone B at which the respective bread loaves have their second dwell period of rest, additional means is also provided for heating the central region of the wrapper at which band 3 is located if a band is employed. When a band is employed, such region is of greater thickness than the remainder of the wrapper seam. Consequently, more heat should be imparted at the band region to effect the heat sealing. In this connection, the band is desirably of wax coated printed paper and if sufficient heat were imparted to sleeve 46 to heat seal the wrapper region as well as the remainder of the polyethylene wrapper seam, the polyethylene film might become damaged.

The additional heating means for the band region comprises a metal support structure 51 fixedly secured to the frame of the machine, and which has a relatively thick central flat heat imparting plate portion 52 of a width substantially coextensive with the width of wrapper band 3. Support structure 51 carries a pair of freely journalled spaced apart rollers 53, one at the front and one at the rear of plate portion 52, and an endless sheet in the form of belt 54 engages plate portion 52 and is carried by the freely journalled rollers 53. Belt 54 is of substantially the same width as plate portion 52 and is of the same type of material as belts 31 and sleeve 46. The under reach of belt 54 engages a guide button 56 fixed to the underside of plate portion 52. Heating of plate portion 52 is effected by suitable electrical resistance means 57; and heat sensing means 58 is provided to control automatically the temperature of plate portion 52 which imparts heat to belt 54.

The side portions of support 51 comprise unheated grooved relatively narrow flat sections 59 against which the unbanded end portions of the wrapper pass. As with respect to the remainder of the heat sealing elements, it will be noted that belt 54 is mounted for free movement so that it is also driven by the loaves as they are moved thereover to accomplish the result previously related. In this connection, the dwell period of the respective loaves on belt 54 provides for adequate time to effect the heat sealing of the band region of the wrapper at the desired temperature. With reference to FIG. 3, it will be noted that side sections 59 are adjacent the sides of belt 54 and are separated from plate portion 52 by gaps 61; the side sections 59 being secured to portion 52 by short narrow welded bars 62. Thus, a heat transfer barrier exists between heated plate portion 52 and side sections 59; and since plate portion 52 is the only region heated, insufficient heat will be transferred to side sections 59 to cause damage to polyethylene film as the unbanded regions of the wrapper seam passes over side sections 59.

From FIGS. 4 and 5, it will be noted that the top surface 42 of anvil 41 is located slightly above the trackway of the machine and also above the flat top surface of heat imparting plate portion 52. This is for the purpose of insuring that adequate contact is obtained between the roller means 46 and the seam 14 of the bread wrapper. A suitable distance is about three-eights to a quarter of an inch. If band 3 is not employed with the wrapper, then the additional heating means at 52 need not be energized.

From the preceding, it is seen that regions of the wrapper having overlapped portions to be heat sealed come in contact with freely movable heat sealing elements that are driven by the bread as it is moved along to avoid frictional drag which would damage polyethylene film in the region of its fusion temperature. This is particularly important with respect to the seam 14 region because there is only two ply thickness at the unbanded portions of seam 14. Also, the two dwell periods in heat sealing zone B insure adequate time for sealing of the wrapper seam and band portion region. In this connection, a desirable commercial type of polyethylene film suitable as a bread wrapper is about one mil in thickness and is of the so-called medium density type. For a film of such character and with a machine wrapping about 50 loaves per minute which is average commercial practice, the dwell periods at the respective heat sealing locations for the wrapper seam will be slightly over one second each.

A suitable temperature for maintaining the heating means for side belts 31 is about 250° F. and also about 250° F. for the sleeve roller means 46. A suitable temperature for plate portion 52 is about 275–300° F. Such temperatures will bring the described polyethylene film up to its heat sealing or fusion temperature. However, it is to be understood these temperatures and times are not critical and can be varied to suit different conditions, such as different types or thickness of polyethylene film, and different rates of machine operation.

End labels 24 need not be applied to the wrapper end folds but it is customary to apply the same. If they are applied, it is also desirable to heat folders 19 adjacent the label applying means 26 to a temperature for preheating the end folds of the wrapper below the melting point of polyethylene film for imparting very slight tackiness to such folds to cause the labels to cling readily thereto when they are first applied prior to the actual heat sealing step. Any preheating temperature is suitable as long as the polyethylene film is not heated too close to its melting point so as to drag against and stick to the preheating folders 19. A suitable preheating temperature for folders 19 is about 150–175° F.

Any suitable heat sealable thermoplastic coating can be employed on the end labels provided it will adhere well to polyethylene film for which the present apparatus and method are primarily intended, as well as to other types of heat sealable wrappers previously mentioned. A suitable type of coating is one which comprises essentially polyethylene because it is compatible with polyethylene and will therefore adhere readily thereto, as well as to the other materials. Suitable formulations are disclosed and claimed in assignee's copending application, by James E. Smith, Serial No. 775,782, filed November 24, 1958, for "Heat Sealable Label, Label Roll and Method of Manufacture."

The preferred formulation for the end label coating as disclosed in such application is about 80% by weight "Epolene C" (polyethylene) having a melting point of 208° F., a molecular weight of about 4,500–5,000 (Staudinger) and a density of about 0.907 which is manufactured by Eastman Chemicals Product, Inc., and about 20% by weight "Piccolyte S–115L" by Pennsylvania Industrial Chemical Company, which is a polyterpene resin derived from residues of petroleum refining operation, having a melting point of about 239° F., a molecular weight of about 1,200 (Staudinger) and a density at 60° F. of about 0.980.

In the modification described, the seam sealing means and band region sealing means is mounted directly between the wrapper end fold sealing belts 31. FIG. 12 illustrates a modification in which all of the parts are substantially the same except that the seam sealing means and band sealing means are mounted ahead of wrapper end fold sealing belts 31. In other words, the seam regions are heat sealed first. This modification may be desirable under certain circumstances as it facilitates lateral adjustment of the side belts without interference from pusher arms 12 which enter partially between the belts at the time they are about to swing clockwise.

The same reference numerals are applied to the parts of the FIG. 12 modification which correspond to the parts in the modification described previously. In the modification of FIG. 12, the regular side sealer plates 63 originally on the machine are not removed but are left at the sides of the seam and band sealer means. Instead of heating folders 19, side plates 63 may be heated to preheat the end folds below the melting point of the polyethylene wrapper film.

From the preceding, it is seen that the heat sealing apparatus hereof provides a simple attachment for substitution in an existing machine adapting such machine for the wrapping of bread with polyethylene film. At the same time, such attachment can be initially incorporated as the heat sealing zone in any other newly designed machine. Although particularly adapted and necessary for heat sealing polyethylene film wrappers, the apparatus serves equally well for the heat sealing of heretofore employed wax coated paper and lacquer coated cellophane wrappers which hence can be used on the machine interchangeably with polyethylene film wrappers. When other than polyethylene wrappers are being utilized, the heat sealing temperatures of the heat sealing elements are adjusted in accordance with well known practice for these other wrappers.

We claim:

1. Apparatus for heat sealing overlapped end folds and a longitudinally extending seam of overlapped portions of a wrapper of polyethylene film as well as other heat sealable material about bread or the like wound about said bread with a band of heat sealable material narrower than said wrapper whereby the region of the seam at the band has a greater thickness of material than the remainder of the seam, comprising a pair of spaced apart endless flexible belts having exposed surfaces of material readily releaseable from heated tacky polyethylene which the folds at the ends of the bread engage when the wrapped article is moved therepast, heating means surrounded by each belt and engageable therewith to heat the same, spaced apart freely journalled rollers for supporting each of said belts whereby said wrapped article drives the belts when moved therepast, freely movable roller means extending transversely with respect to said belts substantially the distance between said belts and which substantially the full width of said wrapper seam engages when the wrapped article is moved therepast and also drivable by said article, said roller means also having an exposed surface of material readily releaseable from heated tacky polyethylene, heating means for said roller means, and an additional heat sealing element of a width substantially equal to the width of said band and adjacent said roller means which said seam region of greater thickness engages when said article is moved therepast, and means mounting said element for free movement whereby said wrapped article also drives said element when moved therepast.

2. The apparatus of claim 1 in which said additional heat sealing element comprises an endless sheet narrower than said roller means, and the means for mounting said sheet comprises spaced apart freely journalled rollers and a heat imparting member therebetween and engaging said sheet.

3. The apparatus of claim 1 in which said roller means comprises an endless sheet, the heating means therefore comprises a heat imparting member supporting said sheet and having an arcuate surface over which the sheet can move, said additional heat sealing element comprises an endless sheet narrower than said roller means, and the means for mounting said latter sheet comprises spaced apart freely journalled rollers and a flat heat imparting member therebetween and engaging such sheet.

4. The apparatus of claim 3 in which said arcuate surface is located slightly above the top surface of said flat member.

5. The combination with a machine for wrapping bread or the like article with a wrapper of polyethylene film as well as other heat sealable material wherein the wrapper is provided with end folds over each of the opposite ends of each article and with a longitudinal seam extending along one side of such article, and wherein the respective articles are first moved along a trackway to a predetermined location with their longitudinal seams at the bottom and are then moved intermittently so that the respective articles each have a dwell period of rest at a fixed location; of apparatus for heat sealing said end folds and said seam, comprising substantially horizontal roller means at said fixed location mounted for free movement and extending transversely with respect to the direction of movement of said articles whereby the respective articles can rest on said roller means when at rest and drive the same when moved, said roller means consisting essentially of a substantially stationary non-rotatable heat imparting member having an arcuate top surface and an endless flexible tubular sleeve supported freely by said top surface, the cross-sectional shape of said heat imparting member being non-congruent with said sleeve and the circumferential length of said sleeve being substantially in excess of the length of said top surface whereby the sleeve hangs from said surface and the hanging portion is free of engagement with the underside of said heat imparting member, a pair of endless belts spaced apart substantially equal to the length of each article for sealing said end folds, each of said belts being carried by upright spaced apart rollers whereby the articles move with the belts, and means for heating said heat imparting member of said roller means and said belts.

6. The combination of claim 5 wherein the wrapper is wrapped about each article with a band of heat sealable material narrower than said wrapper whereby the region of the seam at the band has a greater thickness of material than the remainder of the seam, the intermittent movement of the articles is such that they have at least two periods of rest at adjacent fixed locations, said roller means of said heat sealing apparatus is located at a first of said fixed locations, and said heat sealing apparatus also includes an additional heat sealing element of a width substantially equal to the width of said band and at the second of said fixed locations which said region of greater thickness engages; means for mounting said element for free movement whereby the articles also drive said element when moved therepast, and means for also heating said element.

7. The combination of claim 6 in which the top of said roller means is located slightly above the top of said additional heat sealing element.

8. The method of heat sealing a polyethylene film wrapper about bread or the like article and which is provided with end folds over each of the opposite ends of the article and with the seam extending lengthwise along one side of the article, which comprises providing substantially horizontally positioned movable roller means consisting essentially of a substantially stationary non-rotatable heat imparting member having an arcuate top surface and an endless flexible tubular sleeve supported freely by said top surface, the cross-sectional shape of said heat imparting member being non-congruent with said sleeve and the circumferential length of said sleeve being substantially in excess of the length of said top surface whereby the sleeve hangs from said surface and the hanging portion is free of engagement with the underside of said heat imparting member, said sleeve having an exposed surface readily releasable from heated tacky polyethylene and said roller means being of a length at least substantially equal to the length of said seam, providing a pair of opposite movable heat sealing means extending transversely with respect to said roller means and spaced apart a distance at least substantially equal to the length of said article and which also have exposed surfaces readily releasable from heated tacky polyethylene, heating said fixed member of said roller means and said heat sealing means, and moving said article in one general direction with the wrapper seam at the bottom to pass over and drive said sleeve of said roller means while thus heated by said heat imparting member and to effect engagement of the ends of the article with said heat sealing means while thus heated.

9. The method of heat sealing a polyethylene film wrapper about bread or the like article and which is provided with end folds over each of the opposite ends of the article and with a seam extending lengthwise along one side of the article, which comprises providing substantially horizontally positioned movable roller means consisting essentially of a substantially stationary non-rotatable heat imparting member having an arcuate top surface and an endless flexible tubular sleeve supported freely by said top surface, the cross-sectional shape of said heat imparting member being non-congruent with said sleeve and the circumferential length of said sleeve being substantially in excess of the length of said top surface whereby the sleeve hangs from said surface and the hanging portion is free of engagement with the underside of said heat imparting member, said sleeve having an exposed surface readily releasable from heated tacky polyethylene and said roller means being of a length substantially equal to the length of said seam, providing a pair of opposite freely movable endless belts extending transversely with respect to said roller means and spaced apart a distance substantially equal to the length of said article and which also have exposed surfaces readily releasable from heated tacky polyethylene, heating said fixed member of said roller means and said belts, moving said article in one general direction with the wrapper seam at the bottom to pass over and engage said roller means to drive the sleeve while thus heated and to effect engagement of the ends of the article with said belts to drive said belts while thus heated, and interrupting said movement of said article to provide a dwell period of rest while said seam is over said roller means.

10. In the method of claim 8 wherein the wrapper is wrapped about said article with a band of heat sealable material narrower than said wrapper whereby the region of the seam at the band has a greater thickness of material than the remainder of the seam; the further steps of providing additional freely movable heat sealing means having an exposed surface readily releasable from heated tacky polyethylene and which is located after said roller means, said additional heat sealing means being of a width substantially equal to the width of said band, heating said additional heat sealing means, moving said article over said additional heat sealing means while thus heated, and interrupting said movement of the article over said additional sealing means to provide a dwell period while said region of greater thickness of material is over said additional sealing means.

11. In the method of claim 8 wherein an end label having a heat sealable coating is applied over an end of the article over the end folds, the further step of preheating said end folds at a temperature below the melting point of the polyethylene prior to moving the article between said endless belts and prior to the application of the label thereto.

12. Apparatus for heat sealing a longitudinally extending bottom seam of overlapped portions of a wrapper of polyethylene film as well as other heat sealable material about bread or the like article wound about said bread with a band of heat sealable material narrower than said wrapper whereby the region of the seam at the band has a greater thickness of material than the remainder of the seam, comprising a trackway having a transversely extending opening, a substantially horizontally positioned heat imparting anvil fixedly located in said opening and having an arcuate top surface extending slightly above the top surface of said trackway, an endless flexible sleeve about and freely supported by said anvil of a length at least substantially the length of said seam which said seam engages when the wrapped article is moved therepast and which is driven by said article when thus moved, means for heating said fixed anvil to impart heat to said sleeve, a substantially flat horizontally positioned fixedly mounted heat imparting plate member adjacent said sleeve of a width substantially equal to the width of said band, a second endless flexible sleeve about and freely supported by said plate member and of a length substantially equal to the width of said flat plate member which said seam region of greater thickness engages when said article is moved therepast and which is also driven by said article when thus moved, and means for heating said plate member to impart heat to said second sleeve.

13. Apparatus for heat sealing a longitudinally extending bottom seam of overlapped portions of a wrapper of polyethylene film as well as other heat sealable material about bread or the like article comprising a substantially horizontally positioned trackway having a transversely extending opening therein; and a substantially horizontally positioned roller structure in said opening consisting essentially of a substantially stationary non-rotatable heat imparting member fixedly located in said opening and having an arcuate top surface, and an endless flexible tubular sleeve supported freely by said arcuate surface, the cross-sectional shape of said heat imparting member being non-congruent with said sleeve and the circumferential length of said sleeve being substantially in excess of the length of said top surface, whereby the sleeve hangs from said surface and the hanging portion is free of engagement with the underside of said heat imparting member for unrestrained movement with respect thereto whereby said article drives said sleeve relative to said heat imparting member when moved therepast.

14. Apparatus for heat sealing a longitudinally extending bottom seam of overlapped portions of a wrapper of polyethylene film as well as other heat sealable material about bread or the like article comprising a substantially horizontally positioned trackway having a transversely extending opening therein; a substantially horizontally positioned roller structure in said opening consisting essentially of a substantially stationary non-rotable heat imparting member fixedly located in said opening and having an arcuate top surface projecting slightly above the top surface of said trackway, and an endless flexible tubular sleeve supported freely by said arcuate surface, the cross-sectional shape of said heat imparting member being non-congruent with said sleeve and the circumferential length of said sleeve being substantially in excess of the length of said top surface, whereby the sleeve hangs from said surface and the hanging portion is free of engagement with the underside of said heat imparting member for unrestrained movement with respect thereto whereby said article drives said sleeve relative to said heat imparting member when moved therepast; and additional heat sealing means comprising a horizontally positioned fixedly mounted heat imparting plate member adjacent said sleeve and having a flat top surface below the top of said arcuate surface, and a second endless flexible tubular sleeve supported freely by said flat surface of said plate member for unrestrained movement with respect thereto whereby said wrapped article also drives said second sleeve relative to said plate member when moved therepast.

15. The apparatus of claim 14 wherein both of said sleeves have an exposed surface of material readily releasable from heated tacky polyethylene.

References Cited in the file of this patent

UNITED STATES PATENTS

| | | |
|---|---|---|
| 2,703,133 | Payton | Mar. 1, 1935 |
| 2,016,627 | Conti et al. | Oct. 8, 1935 |
| 2,080,834 | Petskeyes | May 18, 1937 |
| 2,421,373 | Cozza | June 3, 1947 |
| 2,556,008 | Spalding | June 5, 1951 |
| 2,707,018 | Bolton | Apr. 26, 1955 |
| 2,727,345 | Schoppee | Dec. 20, 1955 |

FOREIGN PATENTS

| | | |
|---|---|---|
| 412,402 | Great Britain | June 28, 1934 |
| 114,269 | Australia | Dec. 4, 1941 |